United States Patent [19]

Okada

[11] Patent Number: 5,706,058
[45] Date of Patent: Jan. 6, 1998

[54] GAMMA CORRECTION CIRCUIT FOR CORRECTING VIDEO DATA OBTAINED BY PHOTOELECTRIC TRANSFER AND HAVING A NON-LINEAR CHARACTERISTIC

[75] Inventor: Hidefumi Okada, Osaka, Japan

[73] Assignee: Sanyo Electric Co., Ltd., Moriguchi, Japan

[21] Appl. No.: 697,730

[22] Filed: Aug. 29, 1996

[30] Foreign Application Priority Data

Sep. 5, 1995 [JP] Japan .................................. 7-227847

[51] Int. Cl.$^6$ .................................................. H04N 5/202
[52] U.S. Cl. ............................................ 348/674; 348/254
[58] Field of Search ..................................... 348/674, 675, 348/254; H04N 5/202, 9/69

[56] References Cited

U.S. PATENT DOCUMENTS 5,282,036  1/1994  Worley, Jr. ............................ 348/674
5,408,267  4/1995  Main ..................................... 348/674

Primary Examiner—Sherrie Hsia
Attorney, Agent, or Firm—Armstrong, Westerman, Hattori, McLeland, & Naughton

[57] ABSTRACT

A gamma correction circuit including a first look-up table in which minimum values of differences between output levels of a gamma correction curve and output levels of a straight line in respective sections formed by dividing a range from a minimum input level to a maximum input level into sixteen are stored. Furthermore, data of differences between the output levels of the gamma correction curve and levels obtained by adding the minimum values to the output levels of the straight line in the respective sections are stored in respective second look-up tables of sixteen. Then, one of the minimum values is read-out from the first look-up table according to upper four bits of input video data, and one of the second look-up tables is selectively enabled by the upper four bits, and data stored in the selected second look-up table is read-out in accordance with lower six bits of the input video data. Outputs from the first and second look-up tables are added to each other so as to output gamma correction data which is then added to the input video data, whereby a gamma characteristic of the input video data is corrected.

5 Claims, 5 Drawing Sheets

F I G. 2

| D1    | 0 | 1   | 2   | 3   | 4   | ..... |
|-------|---|-----|-----|-----|-----|-------|
| b(D1) | 0 | 229 | 273 | 289 | 289 | ..... |

FIG. 3

| LUT 1 | | LUT 2 | | LUT 3 | | LUT 4 | | LUT 5 | | |
|---|---|---|---|---|---|---|---|---|---|---|
| D2 | C(D2) | D2 | C(D2) | D2 | C(D2) | D2 | C(D2) | D2 | C(D2) | ... |
| 0 | 0 | 0 | 0 | 0 | 0 | 0 | 0 | 0 | 6 | |
| 1 | 44 | 1 | 1 | 1 | 0 | 1 | 0 | 1 | 6 | |
| 2 | 59 | 2 | 3 | 2 | 1 | 2 | 1 | 2 | 6 | |
| 3 | 71 | 3 | 4 | 3 | 1 | 3 | 1 | 3 | 6 | |
| 4 | 80 | 4 | 5 | 4 | 2 | 4 | 1 | 4 | 6 | |
| 5 | 88 | 5 | 6 | 5 | 2 | 5 | 1 | 5 | 6 | |
| 6 | 95 | 6 | 7 | 6 | 2 | 6 | 1 | 6 | 6 | |
| 7 | 101 | 7 | 7 | 7 | 3 | 7 | 1 | 7 | 6 | |
| 8 | 107 | 8 | 8 | 8 | 3 | 8 | 1 | 8 | 6 | |
| ⋮ | ⋮ | ⋮ | ⋮ | ⋮ | ⋮ | ⋮ | ⋮ | ⋮ | ⋮ | |
| 54 | 218 | 54 | 40 | 54 | 15 | 54 | 3 | 54 | 1 | |
| 55 | 219 | 55 | 40 | 55 | 15 | 55 | 3 | 55 | 1 | |
| 56 | 220 | 56 | 40 | 56 | 15 | 56 | 3 | 56 | 1 | |
| 57 | 221 | 57 | 41 | 57 | 15 | 57 | 3 | 57 | 1 | |
| 58 | 223 | 58 | 41 | 58 | 16 | 58 | 3 | 58 | 1 | |
| 59 | 224 | 59 | 42 | 59 | 16 | 59 | 3 | 59 | 1 | |
| 60 | 225 | 60 | 42 | 60 | 16 | 60 | 3 | 60 | 0 | |
| 61 | 226 | 61 | 43 | 61 | 16 | 61 | 3 | 61 | 0 | |
| 62 | 227 | 62 | 43 | 62 | 16 | 62 | 3 | 62 | 0 | |
| 63 | 228 | 63 | 44 | 63 | 16 | 63 | 3 | 63 | 0 | |

5,706,058

GAMMA CORRECTION CIRCUIT FOR CORRECTING VIDEO DATA OBTAINED BY PHOTOELECTRIC TRANSFER AND HAVING A NON-LINEAR CHARACTERISTIC

BACKGROUND OF THE INVENTION

1. Field of the Invention

The present invention relates to a gamma correction circuit. More specifically, the present invention relates to a gamma correction circuit in which video data obtained by photoelectric transfer and having a nonlinear characteristic is corrected in accordance with a gamma correction curve.

2. Description of the Related Art

In a conventional gamma correction circuit 1 as shown in FIG. 5, data of differences between output levels $y = \gamma(x)$ of a gamma correction curve and output levels $y=x$ of video data shown in FIG. 4 are stored in a look-up table 2 constituted by a ROM, and one of the data corresponding to input video data is read-out from the look-up table 2. Then, the data read-out is multiplied by a gamma correction coefficient $\gamma$ by a multiplier 3, and upper ten bits of multiplication result data and the video data are added to each other by an adder 4. Therefore, the gamma correction characteristic can be changed in accordance with the gamma correction coefficient $\gamma$ and the video data can be corrected by the gamma correction characteristic.

However, in such a prior art, since the data of the differences between the output levels of the gamma correction curve and the output levels of the video data are written into the look-up table 2, it is needed to increase a memory capacity of the look-up table 2 in accordance with the gamma correction curve, i.e. an exponent of power.

SUMMARY OF THE INVENTION

Therefore, a principal object of the present invention is to provide a novel gamma correction circuit.

Another object of the present invention is to provide a gamma correction circuit capable of reducing a memory capacity of a look-up table.

According to the present invention, a gamma correction circuit comprises: a first look-up table which stores a minimum value of differences between output levels of a gamma correction curve and output levels of a straight line indicative of an input and output characteristic of an input video signal for each of sections formed by dividing a range from a minimum input level to a maximum input level; a plurality of second look-up tables in each of which data of differences between the output levels of the gamma correction curve and the levels obtained by adding the minimum values to the output levels of the straight line for each of the sections are stored; selection means for selecting one of the second look-up tables in accordance with a level of the input video signal; and a first addition means which adds the minimum value read-out from the first look-up table in accordance with the level of the input video signal and the data read-out from the second look-up table selected by the selection means.

The range from the minimum input level to the maximum input level is divided into sixteen sections, for example, and the minimum value of the differences between the output levels of the gamma correction curve and the output levels of the straight line is stored in advance in the first look-up table for each of the sections. In addition, the straight line is for indicating an input and output characteristic of the video signal, for example, and the video signal is converted into the video data of ten bits, for example. Upper four bits of the video data are applied to the first look-up table as its address data, for example, and therefore, the minimum value corresponding to the level of the video data is read-out from the first look-up table. In contrast, the data of the differences between the output levels of the gamma correction curve and the data obtained by adding the minimum value to the output levels of the straight line are stored in advance in each of the second look-up tables of sixteen, for example. Lower six bits of the video data are applied to the respective second look-up tables as addresses therefor, and therefore, data corresponding to the level of the video signal, i.e., the lower six bits of the video data are read-out to be applied to a selection circuit. The upper four bits of the video data are also applied to the selection circuit as selection data, and therefore, the data corresponding to the level of the video signal, i.e., the upper four bits of the video data is selected. That is, one of the second look-up tables is selected. Thereafter, the minimum value read-out from the first look-up table and the data read-out from the selected second look-up table are added to each other by an adder to obtain gamma correction data. The gamma correction data is added to the input video data, whereby the gamma characteristic of the input video data is corrected.

According to the present invention, since the data of the second look-up tables are optimized, it is possible to reduce a total memory capacity of the first and second look-up tables.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a first look-up table;

FIG. 3 is an illustrative view showing a second look-up tables;

DETAILED DESCRIPTION OF THE PREFERRED EMBODIMENTS

Figure 1:
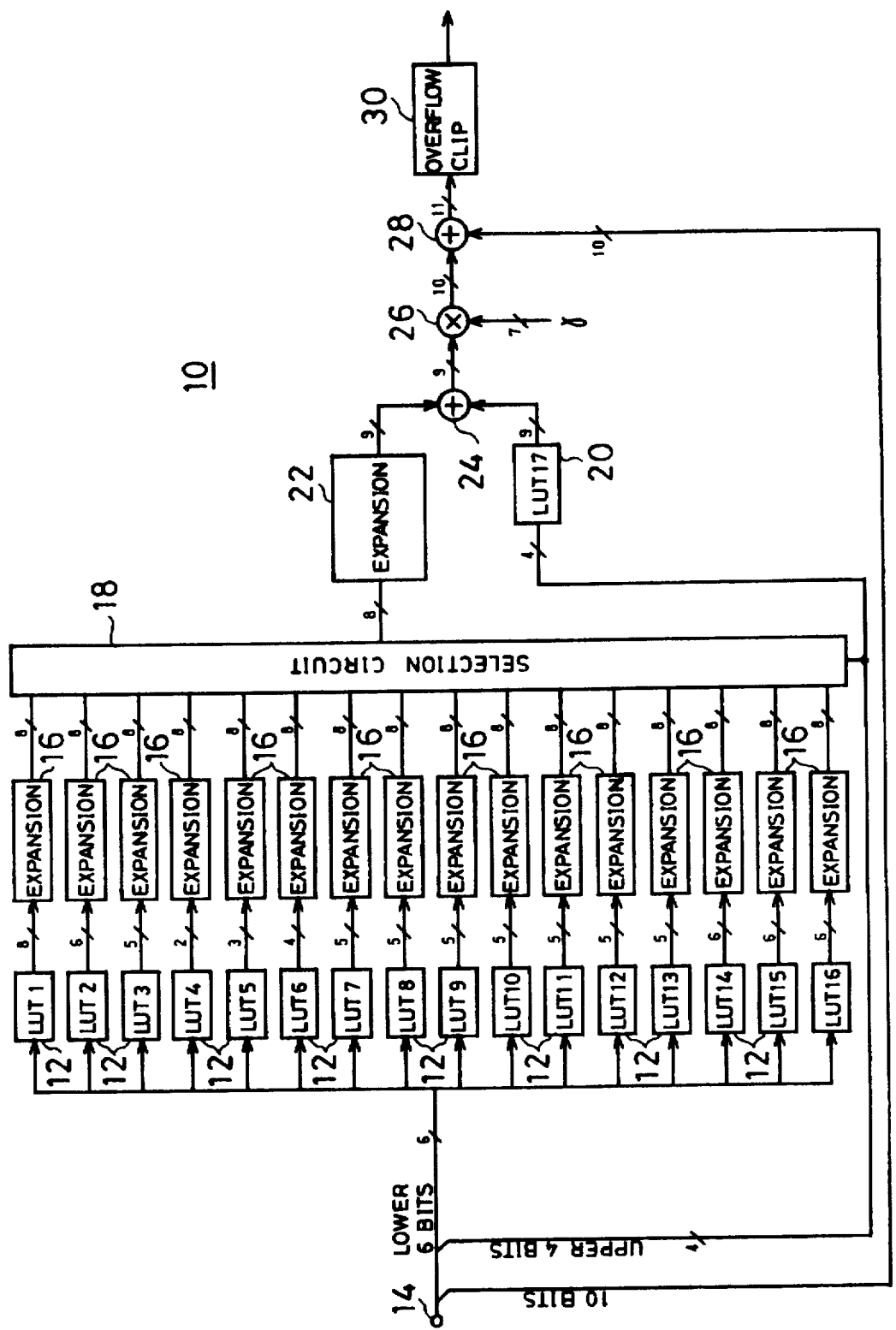
FIG. 1 is a block diagram showing one embodiment according to the present invention.

A gamma correction circuit 10 of this embodiment shown in FIG. 1 includes an input terminal 14 which receives video data of ten bits, for example. Upper four bits included in the video data are applied to a selection circuit 18 and a first look-up table 20 as control data and address data D1, respectively, and lower six bits of the video data are applied to second look-up tables 12 of sixteen as address data D2. Therefore, the first look-up table is read-out by the address D1, i.e. the upper four bits of the video data, and the second look-up tables are read-out by the address D2, i.e. the lower six bits of the video data. Furthermore, the video data itself is applied to an adder 28.

Figure 2:
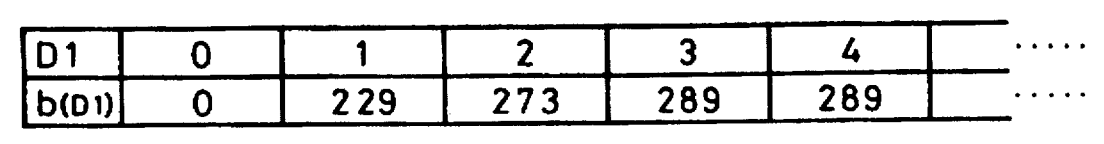
Figure 4:
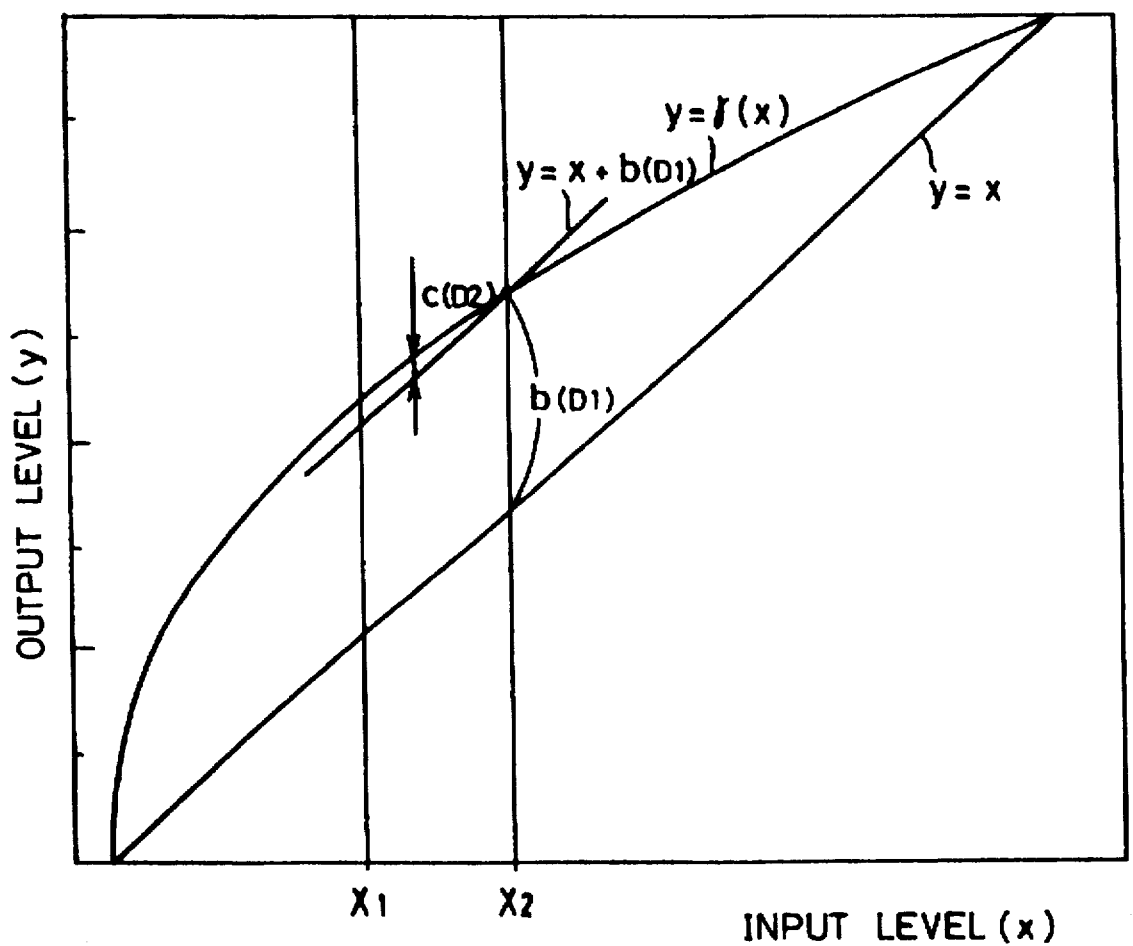
FIG. 4 is a graph showing a gamma correction curve and an input and output characteristic of video data.

In the first look-up table 20, minimum value data b(D1) are stored in correspondence with respective address data D1 as shown in FIG. 2. More specifically, a range from a minimum input level to a maximum input level of the video data, shown in FIG. 4, is divided into sixteen sections. Then, with referring to FIG. 4, in a case of the section from $x_1$ to $x_2$, a difference between an output level $y=\gamma(x_2)$ of the gamma correction curve and an output level $y=x_2$ of the video data becomes minimum out of differences between output levels y=γ(x) and output levels y=x. Such the minimum value data b(D1) for each of the sections is stored in each address represented by the address data D1 from "0" to "16" of the first look-up table 20.

Furthermore, as shown in FIG. 3, data c(D2) are stored in the respective second look-up tables 12 in correspondence with the address data D2 from "0" to "63" for each of the sections. More specifically, range of $0 \leq x \leq 1023$ is equally divided into the sixteen sections, and differences between the output levels y=γ (x) of the gamma correction curve and levels y=x +b(D1) obtained by adding the minimum value data b(D1) to the output levels y=x are stored in each of the second look-up tables 12 as the data c(D2). Accordingly, one of the data c(D2) is indicated by a following equation (1).

$$c(D2)=\gamma(x)-(x+b(D1)) \quad (1)$$

The data c(D2) corresponding to the address data D2 are outputted from the respective second look-up tables 12. However, since bit lengths of the respective data c(D2) are different from each other as understood from FIG. 3, output bit lengths of the respective second look-up tables 12 become different from each other.

Accordingly, dummy bits are added to upper portions of the respective data c(D2) which are read-out by bit expansion circuits 16 corresponding to the respective second look-up tables 12, whereby the bit lengths of the data c(D2) are uniformed to eight bits. The selection circuit 18 selects one of the data c(D2) in accordance with the control data. The selected data c(D2) is added with a dummy bit by a bit expansion circuit 22, and then applied to an adder 24.

In contrast, the minimum value data b(D1) corresponding to the address data D1 is read-out from the first look-up table 20, and the minimum value data b(D1) is added to the data c(D2) from the bit expansion circuit 22 by the adder 24. Then, addition result data b(D1) +c(D2) is multiplied by a gamma correction coefficient γ of seven bits by a multiplier 26. Lower six bits of multiplication result data {b(D1)+c (D2)}×γ of sixteen bits are omitted by an omission circuit (not shown), and only upper ten bits of the multiplication result data are applied to an adder 28. Thus, by omitting the lower six bits, it is possible to multiple the addition result data b(D1) +c(D2) by a decimal number. That is, in a case where "128" is applied to the multiplier 26 as the gamma correction coefficient γ the addition result value is doubled; however, in a case where "32" is applied to the multiplier 26 as the gamma correction coefficient γ the addition result value is halved.

The multiplication result data of ten bits are added to the video data of ten bits by the adder 28, and then, upper one bit is clipped by an overflow clip circuit 30. Accordingly, video data which is indicated by a following equation (2) and has been subjected to the gamma correction is outputted from the overflow clip circuit 30.

$$y=x+\{b(D1)+c(D2)\}\times\gamma \quad (2)$$

Figure 5:
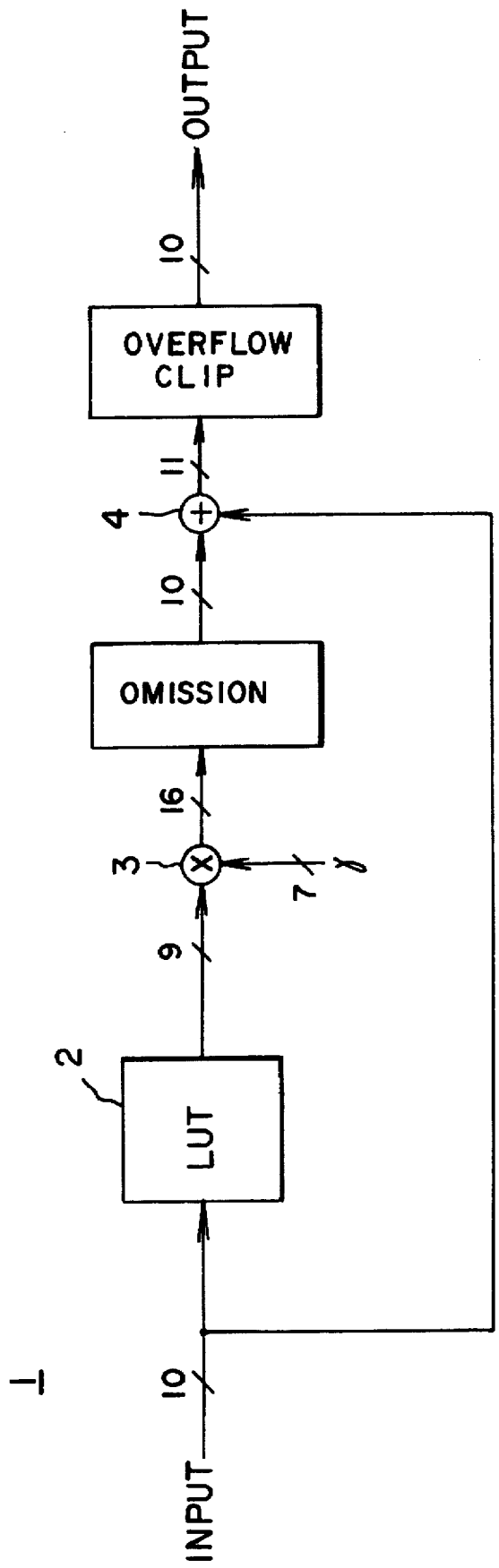
FIG. 5 is a block diagram of related art.

Thus, since the data stored in the first look-up table 20 and the second look-up tables 12 are optimized, it is possible to drastically reduce a total memory capacity in comparison with the prior art. More specifically, though a memory capacity of 9216 bits ($=2^{10} \times 9$) was necessary for the look-up table 2 of the gamma correction circuit 1 shown in FIG. 5, the total memory capacity of the first look-up table 20 and the second look-up tables 12 of this embodiment becomes 5328 bits as indicated by a following equation (3), and it is possible to reduce the memory capacity about 42% in comparison with the prior art look-up table 2.

$$16\times9+64\times(8+6\times4+5\times8+4+3+2)=5328 \text{ bits} \quad (3)$$

In addition, the selection circuit 18 and the adder 24 are necessary for the gamma correction circuit 10 of this embodiment; however, since the selection circuit can be constituted by gates of about fifty, and the adder 24 can be constituted by gates of about 300, there is not a big problem even if the above described embodiment is to be incorporated into an IC.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A gamma correction circuit, comprising:

a first look-up table which stores a minimum value of differences between output levels of a gamma correction curve and output levels of a straight line indicative of an input and output characteristic of an input video signal for each of sections formed by dividing a range from a minimum input level to a maximum input level;

a plurality of second look-up tables in each of which data of the differences between the output levels of the gamma correction curve and levels obtained by adding minimum values to the output levels of the straight line for each of the sections are stored;

selection means for selecting one of the second look-up tables in accordance with a level of the input video signal; and a first addition means which adds the minimum value read-out from the first look-up table in accordance with the level of the input video signal and the data read-out from said one of the second look-up tables selected by the selection means.

2. A gamma correction circuit according to claim 1, wherein the video signal is digital video data of a predetermined number of bits, and the level is predetermined upper bits of the video data, and said one of the second look-up tables is read-out by predetermined lower bits of the video data.

3. A gamma correction circuit according to claim 2, further comprising a second addition means for adding an output of said first addition means and the video data to each other.

4. A gamma correction circuit according to claim 1, further comprising; uniforming means which uniforms bit lengths of the data outputted from the respective second look-up tables.

5. A gamma correction circuit according to claim 4, wherein the uniforming means includes a plurality of bit expansion means corresponding to the respective second look-up tables.

* * * * *